United States Patent [19]

Selin

[11] Patent Number: 4,746,207

[45] Date of Patent: May 24, 1988

[54] AUTOMATIC PRINTING MACHINE FOR PRINTING TEXT ON CINEMATOGRAPHIC FILM

[75] Inventor: Björn Selin, Solna, Sweden

[73] Assignee: AB Film Teknik, Solna, Sweden

[21] Appl. No.: 930,180

[22] PCT Filed: Feb. 17, 1986

[86] PCT No.: PCT/SE86/00067

§ 371 Date: Oct. 22, 1986

§ 102(e) Date: Oct. 22, 1986

[87] PCT Pub. No.: WO86/05005

PCT Pub. Date: Aug. 28, 1986

[30] Foreign Application Priority Data

Feb. 20, 1985 [SE] Sweden ............................... 8500882

[51] Int. Cl.[4] ............................................. G03B 21/32

[52] U.S. Cl. ......................................... 352/90; 355/40

[58] Field of Search ............................. 352/90; 355/40

[56] References Cited

U.S. PATENT DOCUMENTS

| | | | |
|---|---|---|---|
| 2,051,603 | 8/1936 | Hruska | 352/90 |
| 3,661,579 | 5/1972 | Vrancken et al. | 352/90 |

FOREIGN PATENT DOCUMENTS

| | | | |
|---|---|---|---|
| 2205404 | 9/1972 | Fed. Rep. of Germany | 352/90 |
| 2036369 | 6/1980 | United Kingdom | 352/90 |

*Primary Examiner*—Monroe H. Hayes
*Attorney, Agent, or Firm*—Pollock, Vande Sande & Priddy

[57] ABSTRACT

An automatic printing machine for printing text on film has a main shaft (40) which is provided with an eccentric operative in driving a pressure-plate supporting slide via a knee joint which can be straightened out by a rotary magnet (41). Arranged on the opposite side of the film path is an open bracket structure (30), on which a counter-pressure plate (30) is mounted. The pressure exerted by the counter-pressure plate can be varied with the aid of a force source which is independent of the bracket structure (30), and consequently the bracket structure does not need to take up the counter-pressure exerted by the counter-pressure plate and is not subjected to said pressure.

3 Claims, 8 Drawing Sheets

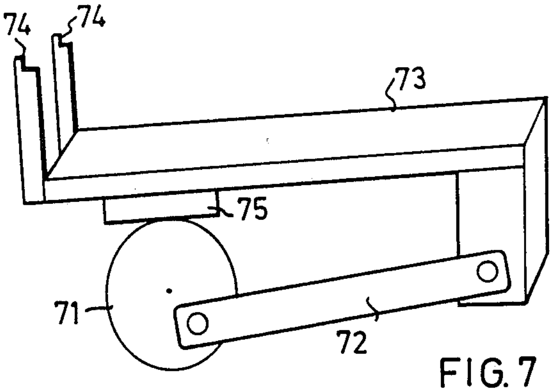
FIG. 7
FIG. 8
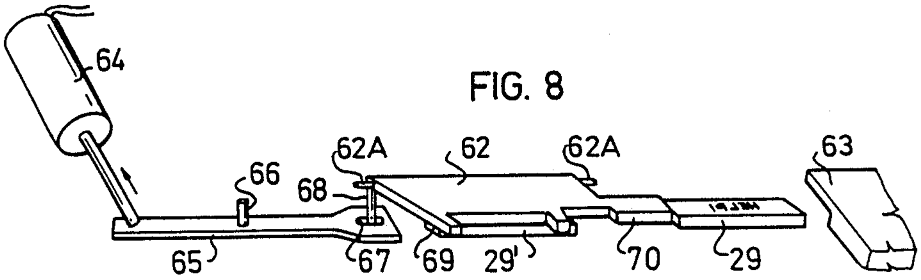

AUTOMATIC PRINTING MACHINE FOR PRINTING TEXT ON CINEMATOGRAPHIC FILM

FIELD OF THE INVENTION

The invention relates to an automatic printing machine for printing text on cinematographic film.

BACKGROUND OF THE INVENTION

A method of applying text with the aid of printing methods to cinematographic film where the language spoken on the film sound-track is different from the native tongue of the audience was devised more than fifty years ago. Normally, such text cannot be applied photographically, since only finished copies of the film are made available for export by the film company concerned, and to the negative. As evidenced by, for example, Norwegian Pat. Nos. 85, 523, 93, 143, 93, 144, 94, 660, 99, 749 and 108, 989, and Swedish Pat. Nos. 82, 146, 84, 499, 87, 870, 92, 700, 334,538, such methods have long been known in this art. In present day methods, the text is applied by covering the emulsion with a layer of wax which is brought into penetrating engagement with a printing block or plate provided with raised alphabetical letters, such as to expose the emulsion partially, whereafter the exposed emulsion is dissolved and removed and finally the wax is washed-off.

In known printing machines of the kind in question (e.g. Fr-A-2 239 708), the film is drawn forwards with the aid of a conventional feed arrangement, which includes a gripping mechanism, in a manner such that each frame of the film remains stationary for a given length of time in a printing station in which a printing block is pressed from beneath into engagement with the wax-coated layer of emulsion by means of a pressure plate which is coupled cinematographically with the gripping mechanism. A stationary counter-pressure plate is arranged in a bridge extending across the printing station. The pressure must be varied in accordance with the length of the text to be printed. For example, if the text "Help!" were printed with the same force as that applied when printing the words "my dear girl, you are wolfing your food", the film would be perforated. Consequently, the pressure plate is provided mechanically with a strong spring which can be adjusted to varying degrees of tension, or with a pneumatic cylinder. In addition to making the machine complicated, it is difficult to achieve controllability for large and small pressure forces with one and the same spring. It should be possible to vary the counter-pressure within a range of, for example, 20–700N. The operator has in front of him a manuscript on which he has noted the value of the counter-pressure required. When changing text, the operator operates a slide means, with which he permits a fresh printing block or plate to displace the preceding block from the printing station and to take its place. Known printing machines of this kind comprise in this order, a reel holder, a first wax-applicator for applying wax to the surface of the film frames, the printing machine, a second wax-applicator for applying wax to the perforated frame-edges (which cannot be waxed until the gripping machine has completed its function), an etching bath, a rinsing bath, a first drying section, two successive washing baths containing a wax-dissolving substance, a second drying station, and a wind-up device for winding-up the treated film. Although such prior art machines are constructed rationally for continuous operation, it still takes from five to six hours to provide a feature film with text and sub-titles, even when using the best apparatus known.

SUMMARY OF THE INVENTION

The object of the invention is to provide an automatic printer of the aforesaid kind which will operate more rapidly, more reliably, and more automatically than said known printers, and which is suited for automatically controlling, inter alia, frame changes and adjustment of the counter-pressure, e.g., with the aid of a data-processor.

, Another object is to remove the dependency on springs when making adjustments to the pressure, and therewith to lengthen the useful life of the pertinent machine components and to afford freedom from periodic mechanical adjustments.

A further object is to obtain variable printing force without disturbing parallelism between print plate and counter-plate.

It is desirable to arrange for the improvement of the aforementioned holder which extends across the path of the film and on which the counter-plate is located. This holder, if in bridge form, presents a serious obstacle with regard to attaining a rational solution to the problem of changing small printing blocks one for the other rapidly and reliably (these blocks normally measure 23×4×2 mm). Accordingly, the bridge, which extends transversally to the film path and is attached at both sides to the supporting structure, may be replaced with a bracket structure which is located above the film path and in which the counter-pressure plate is mounted in a guided, slidable fashion, with the possibility of varying the counter-pressure. The large pressure forces, which are applied thrustingly, will, however, draw the bracket structure and therewith the counter-pressure plate, to an inclined position—one is concerned here with forces as high as 700N, in conjunction with small tolerances. In order to overcome this problem, it is proposed in a preferred embodiment, to let the pressure plate be pressed against the film by means of a variable pressure-generator the reaction force of which is taken up independently of the bracket structure. The bracket structure thus merely guides the pressure plate and does not take-up the counter-pressure. As a result of eliminating an otherwise nearly necessary bridge, there is now presented between the printing-block position and the counter-pressure plate an interspace which can be reached from one side of the film in a direction transversally thereto, thereby enabling the installation of an automatically operating and reliable printing-block exchange mechanism.

BRIEF DESCRIPTION OF THE DRAWINGS

The invention will now be described in more detail with reference to a non-limiting exemplifying embodiment thereof reproduced in the accompanying figures.

FIG. 7 illustrates a gripping mechanism.

FIG. 8 illustrates schematically part of a printing-block changing arrangement.

DESCRIPTION OF PREFERRED EMBODIMENT

Figure 1:
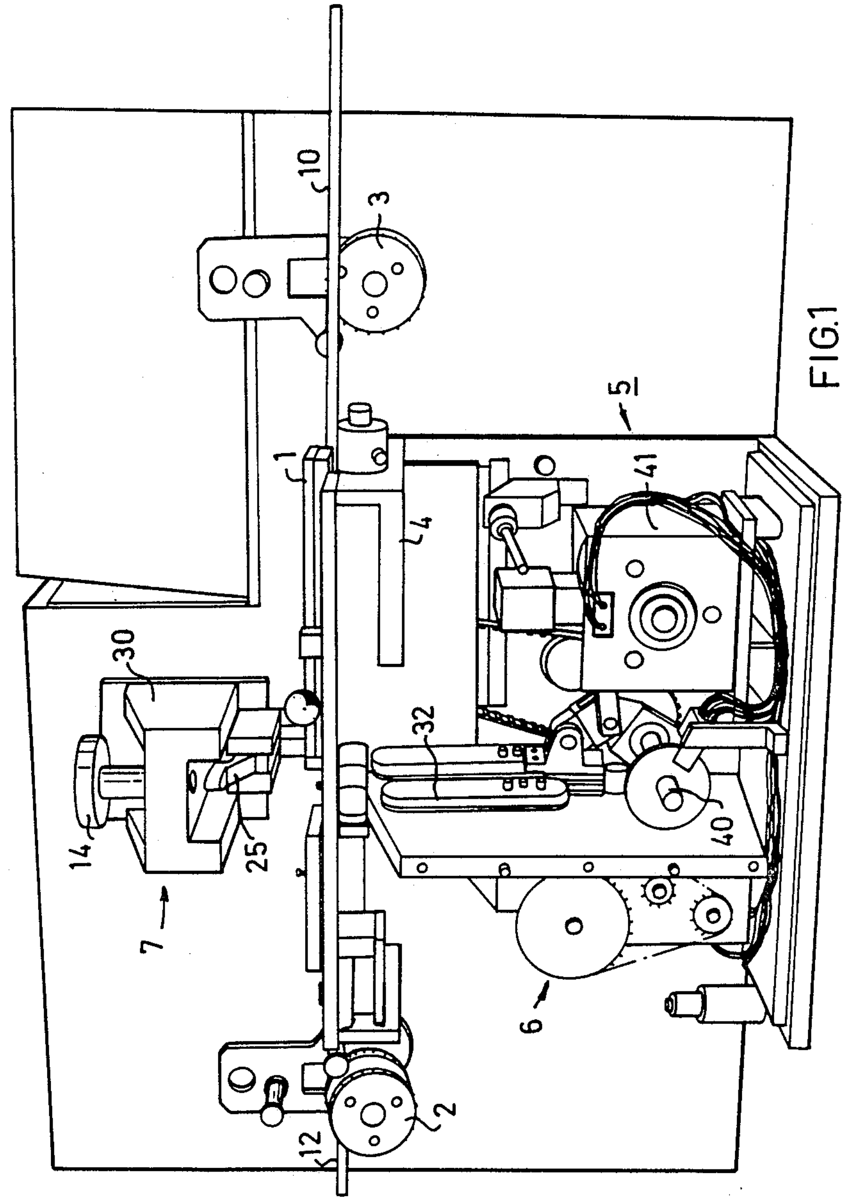
FIG. 1 is a front view of a partially dismantled automatic printing machine.
Figure 2:
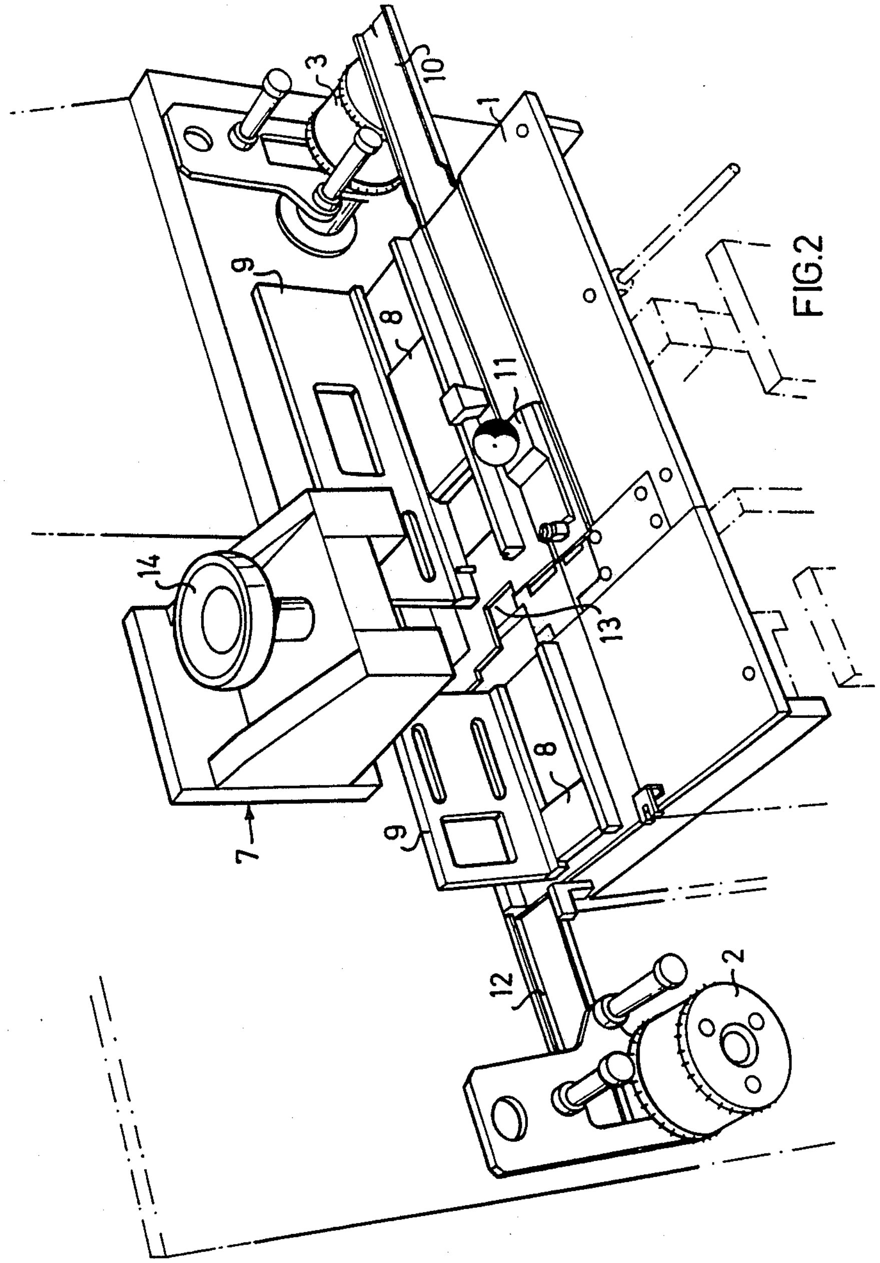
FIG. 2 is a view of the machine illustrated in FIG. 1 taken obliquely from above.

A total view of one embodiment of the invention is given by FIGS. 1 and 2, in which the illustrated apparatus have been relieved of their respective obstructing and, to a certain extent, load-carrying walls. Mounted in a machine frame is a plate 1 in which a film transport path extends between two feed-wheels 2 and 3. Located between the feed-wheels 2 and 3 and the plate 1 are spaces in which the film can be laid in loops, since whereas the film is advanced intermittently over the plate 1, it is fed continuously by the feed-wheels 2 and 3. Beneath the top surface of the plate 1 there are located a gripping mechanism 4; a printing unit 5, which incorporates a vertically movable pressure plate; and a printing block feed unit 6. Located above the plate 1 is a counter-pressure arrangement 7, which is partially dismantled in the illustration in FIGS. 1 and 2.

The film path 8 is best seen from FIG. 2 and extends partially beneath pivotable covers or lids 9, which is shown in a raised position in this figure. Also arranged on the plate 1 is a first transport path or chute 10 for the advancement of a row of printing blocks, which are advanced by a pusher 11 which is drawn by means of a pulley weight and which is shown in FIG. 2 in one terminal position at which the chute is empty. Arranged on the opposite edge side of the film path 8 is a second transport path or chute 12, which receives the used printing blocks fed from the printing-block position 13 located beneath the film path 8.

Figure 6:
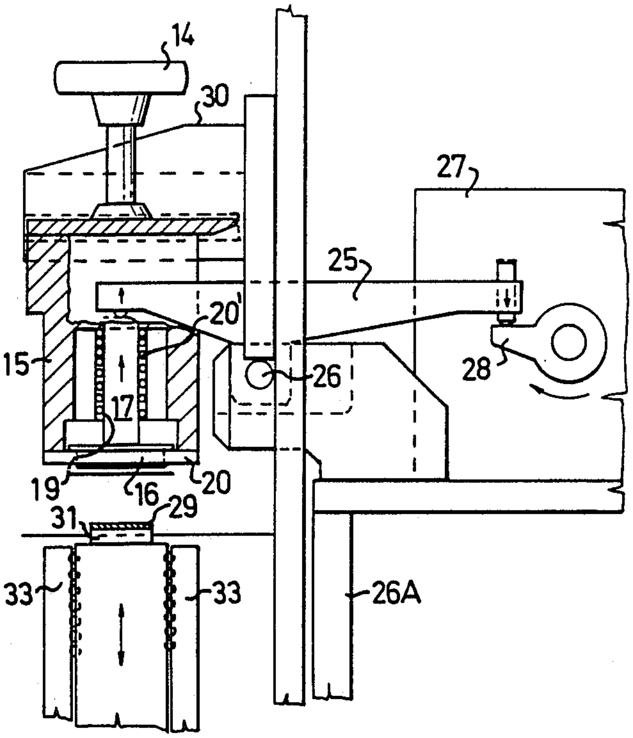
FIG. 6 is a sectional view of the counter-pressure plate and the means for generating a counter-pressure.

An important feature resides in the counter-pressure arrangement shown in a partially dismantled state in FIGS. 1 and 2. These figures show only one bracket structure 30 attached to a vertical wall incorporated in the machine frame and functioning as a stanchion or upright, the bracket structure 30 being provided with a wheel or knob 14 for firmly screwing a counter-pressure unit 15, shown in cross-section in FIG. 6. A counter-pressure plate 16 provided with a stem 17 is mounted on the bracket structure 30 normally firmly screwed into the unit 7 (FIGS. 1 and 2). The stem 17 is mounted in the aperture 19 and the actual pressure plate 16 is accommodated in a rectangular opening and held against falling therefrom by means of a perforated plate 20 attached to the unit 15. The perforated plate is clad with film-protecting velvet along two edges thereof. The stem 17 is journalled in a ball bushing and the pressure plate 16 is urged outwards by means of a weak thrust spring (not shown). In accordance with the invention, the counter-pressure unit 15 shall now obtain its counter-pressure so that the bracket structure 30 is not loaded by the counter-pressure applied, to any appreciable extent. This effect is achieved in the illustrated embodiment by the fact that the end of the stem 17 is subjected to load in its axial direction by one end of a lever arm 25 (which is shown projecting outwards in FIG. 1). The arm 25 can be swung about a shaft 26 which is secured in the machine frame to a separate support device 26A independent of the machine-frame wall which supports the bracket structure 30. Arranged at the opposite end of the carrier arm 25 is a rotary magnet 27 (e.g., type E9 from the German company KUHNKE) having a crank 28 against which said opposite end of the lever arm rests, as shown in FIG. 6. This enables the counter-pressure exerted by the counter-pressure plate 16 to be varied between 0 and 70 kg, depending upon the current supply to the rotary magnet 27.

Figure 9:
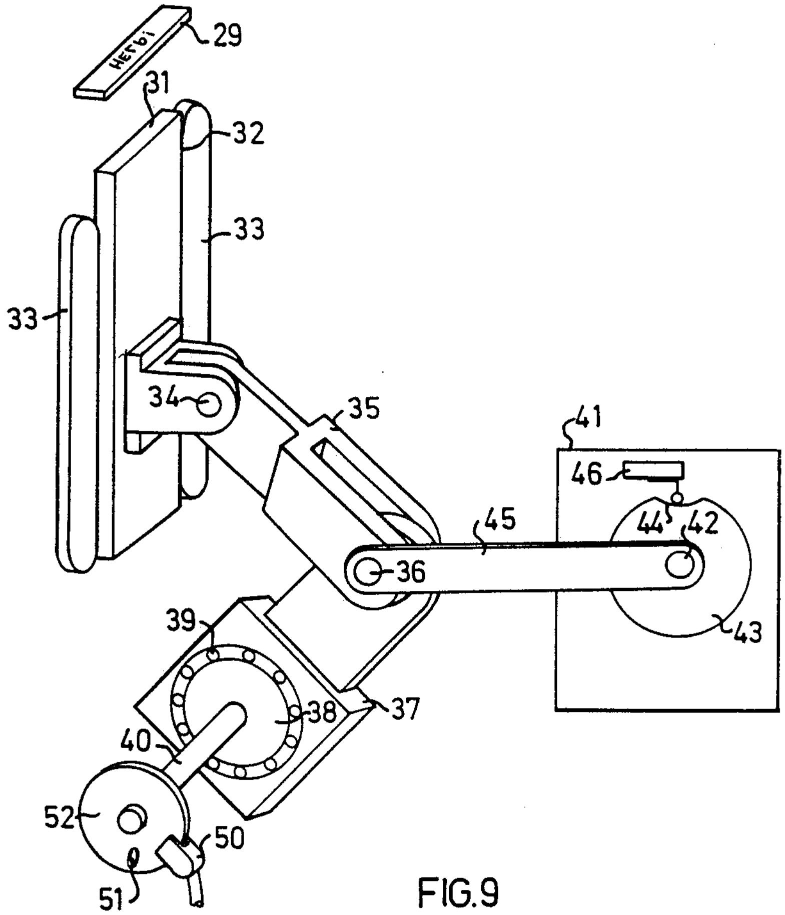
FIG. 9 illustrates schematically an auxiliary mechanism for operating a printing plate.

The actual application of text to the film is effected through a printing unit 5 shown in FIG. 1 and illustrated schematically in FIG. 9. In the act of printing, a printing block 29 located in its printing position 13 is pressed upwards against the counter-pressure plate 16 (FIG. 6) with the film in the film path 8 located between the plate 16 and the block 29, with the side of the film coated with a waxed layer of emulsion facing downwards. The print is applied by lifting the pressure plate 31, on which the printing block 29 is seated, at 13 in FIG. 2, in a fixed printing position (not shown), said pressure plate being lifted at the same time as the counter-pressure plate 16 obtains counter-pressure as a result of supplying current to the rotational magnet 27 (FIG. 6). The pressure plate with the printing block seated thereon can be raised and lowered in time with the intermittent feed, the film, effected through a coupled drive from the main shaft 40 at a speed of one film frame for each revolution of the main shaft 40. Seated on the main shaft 40 is an eccentric disc 38 which is provided with an eccentric ball bearing 39 in which there is journalled one end of a first link 37, the other end of which is journalled on a second link 35, via a knee joint 36, said second link in turn being journalled to the slide 32 incorporated in the ball-slide device 33. As will be seen instantly from FIG. 9, in the position illustrated therein the eccentric motion will primarily result solely in pivotal movement in the knee joint 36, while the pivot point 34 remains stationary. By actuating the rotary magnet 41, however, so that its crank 42 is swung through 50°, it is possible with the aid of the link 45 to move the knee joint 36 to the left in the figure and to "straighten-out" the knee. It is also possible to provide stop means for preventing further rotation of the "knee joint" and to effect self-locking, and in the position thus obtained the eccentric movement will act directly on the slide 32 and cause the pressure plate to move up and down to execute a pressure movement against the printing block 29.

The main shaft 40 is coupled to a gripping mechanism, illustrated schematically in FIG. 7, via a toothed belt (not shown). The mechanism illustrated therein is seated on a horizontaly slidable slide (not shown) which enables the stop position of the film frames to be adjusted in relation to the position of the printing block and therewith to the positioning at the text on respective film frames. The toothed belt drives the cam wheel 71 at a transmision ratio of 1:1, said wheel 71 driving the link 72, and therewith the gripping device 73 backwards and forwards, via a crank. The gripping device 73 is provided on its underside with an anti-friction coating 75 and rests against the cam wheel 79, and consequently both gripping claws 74 of the gripping device 73 mating with the perforations on the film are lifted into engagement with the film in one direction of movement and lowered out of engagement with the film in another direction of movement. The length stroke corresponds to the span of four perforations in a standard film, i.e., the span of one film frame. The aforementioned toothed belt is set so that printing takes place during that half of the stroke within which the film is stationary.

The printing operation is initiated by straightening the knee joint 36 (FIG. 9) by means of the rotary magnet 41. Provided on the cam disc 43 of the magnet 41 is a notch 44 which, in the illustrated inactivated position, is sensed by the microswitch 46. The shaft 40 rotates constantly, and consequently it be important that the magnet 41 is activated at a position in which the eccentric has a low position, which is detected with the aid of a perforated disc 52 provided with an aperture 51 and attached to the main shaft 40, the aperture 51 being sensed by the light fork 50. This activation is suitably effected by firstly applying a strong curent to the magnet 41, followed by a holding current sufficient to guarantee that the knee joint is held straight.

We now arrive at the aforementioned change of printing blocks, which cannot take place, of course, when the printing mechanism is activated. This state is detected by the microswitch 46 (FIG. 9).

Figure 4:
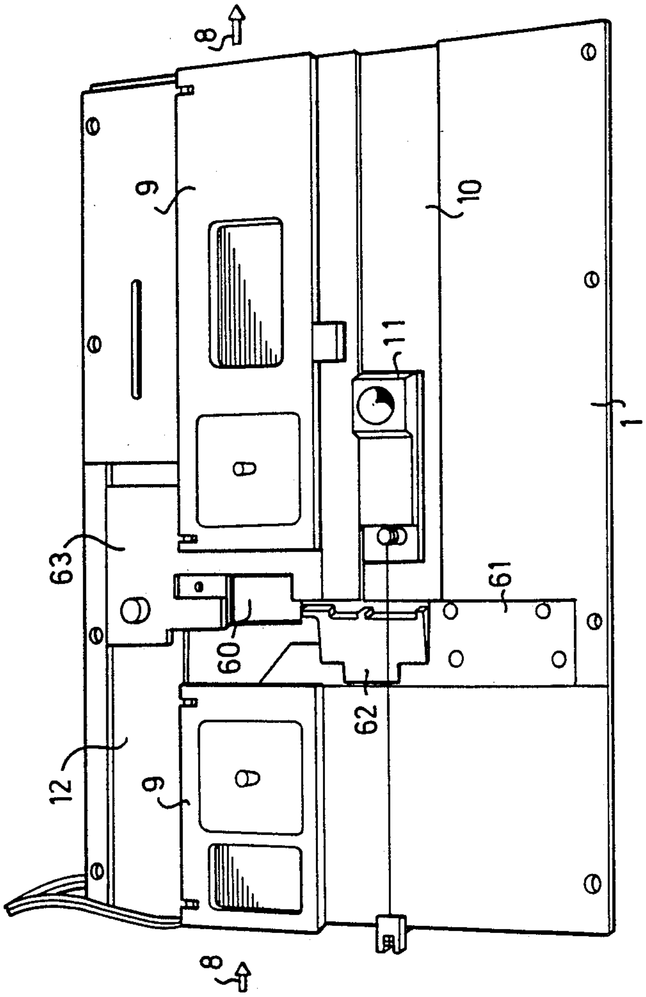
FIG. 4 is a view of a plate incorporated in the printing machine, and lying in the plane of the film.
Figure 5:
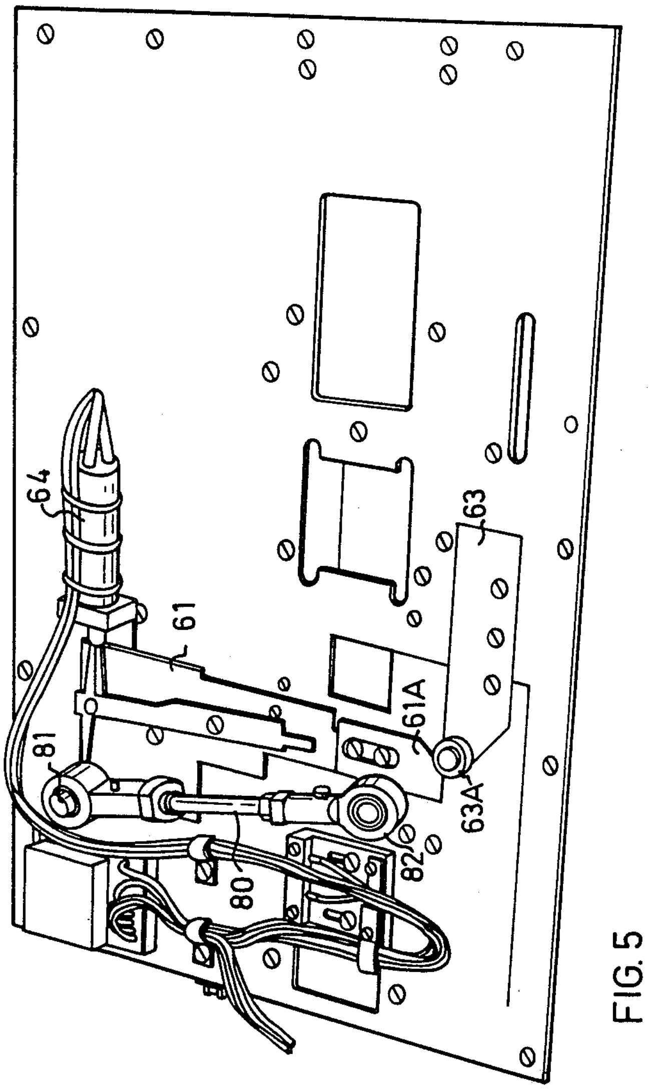
FIG. 5 is a view of the plate in FIG. 4 from beneath.

FIG. 4 shows the uncovered plate 1, where the film path 8 passes beneath the cover plates 9, which are shown in their lowered positions. Printing blocks are changed, one for the other, by urging a printing block from the path 10 to the printing-block position above the opening 60, through which the pressure plate is lifted in accordance with what has previously been described. At the same time, the preceding printing block present in the printing-block position is transferred to the path 12. This change of printing blocks is effected with the aid of a slide 61, which is moved backwards and forwards in a direction at right angles to the film path 8. This mechanism can be seen in FIG. 5, compared with the detail view in FIG. 8. The slide 61 has on the upper side of the plate 1 (FIG. 4) a pivotable flap 62, as best seen from FIG. 8. When the slide is to be driven forward, the flap 62 is dropped with the aid of a pulling magnet 64, mounted on the underside of the slide, via a pivot arm 65, journalled at 66, a fork 67, and an operating arm 68 attached to the flap 62. The pivot arm 65 is loaded by a spring (not shown) which holds the flap 62 in a slightly raised position. When the flap is lowered, it covers the first printing block 29′ in the path 10. The flap is provided with a tooth 70. When the slide is moved to the right in FIG. 8, a part of the slide (not shown in FIG. 8), through the activation of its one end 69, dogs the printing block 29′ at the same time as the printing block 29 located in the printing-block position, is displaced to the right by the tooth 70, towards the path 12. It is to be noted that the printing block 29 is covered by the counter-pressure plate 16 when the whole is in function, thereby preventing the printing blocks from turning onto their respective edges. In order to avoid this from happening subsequent to the printing block 29 having left the printing-block position, a roofed slide 63 is mounted in the receiving path 12 and is retracted so as to afford room beneath its roof for the printing block displaced by the tooth 70. As will be seen from the underneath view of FIG. 5, this is effected as a result of the activation of a roller 63A, mounted on the slide 63, by a bevelled surface 61A on the slide 61, thereby to couple the movements of the slides. As a result of the arrangement of these components, the printing blocks are maneuvered in a manner which minimizes the chances of the printing block becoming jammed, thus making automatic operation possible and enabling the used printing blocks to be kept in the correct order when text is to be printed on the next copy of the same film. Neither is there a risk of a printing block being dropped and lost. In particular, the fact that the printing blocks are manipulated individually and that a following printing block is not permitted to displace the preceding block affords improved reliability, particularly in view of the fact that it cannot always be guaranteed that the measurements of the blocks are precise and that the blocks are free of burrs.

The slide 61 is maneuvered by means of a link 80 (FIG. 5) which is pivotally mounted in the slide at 81 and journalled to a crank at 82. The drive means herefor, referenced 6 in FIG. 1, is shown more clearly in FIG. 3, where the crank 83 is intended to be connected to the journal 82 (FIG. 5) on the link 80. A change of printing blocks takes place when the crank 83 is driven through one revolution. This is effected by rotation of the shaft 84, effected by means of a motor and a magnetic clutch (neither being shown) connected to the main shaft, the output shaft of said motor driving the shaft 84 via a torque-maximizing friction clutch 85, which has been included for reasons of safety. The shaft 84 drives a shaft 87 via a chain transmission, and the shaft 87, in turn, drives a bevel gear 88, the output shaft 89 of which has the crank 83 fitted thereto. In order to ensure that the crank 83 will always be rotated precisely through one revolution during a printing-block exchange sequence, the shaft 87 has fitted thereon a cam plate 90 having arranged therein a recess into which a spring-biased cam-follower 91 can be lowered so as to pull the shaft 87 to a "home position". The aforesaid magnetic clutch (not shown) is therewith disengaged immediately prior to reaching the home position, under the activation of a light fork acting on a perforated plate (not shown) mounted on the shaft 87.

Figure 3:
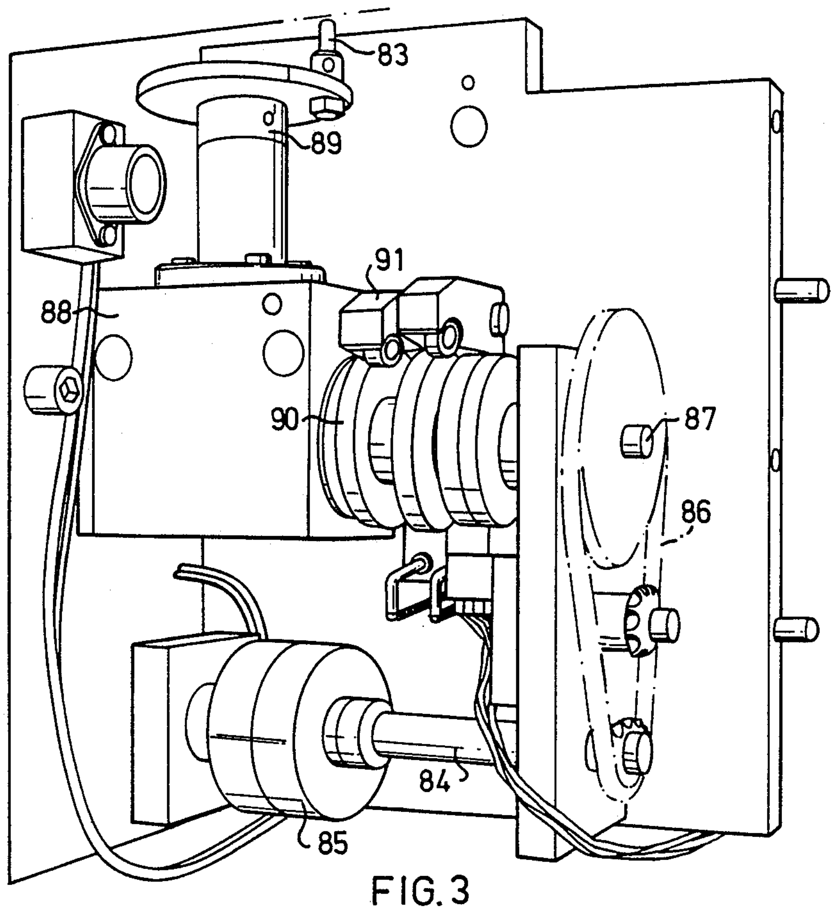
FIG. 3 illustrates the mechanism used to effect a change of printing blocks.

It will again be noted that the mechanism illustrated in FIG. 3 cannot be activated unless the pressure-generating mechanism is passive (detected through the microswitch 46 in FIG. 9). Neither can the mechanism for straightening the knee joint, illustrated in FIG. 9, be activated while the mechanism in FIG. 3 is in an active state.

The stroke-length of the knee-joint movement is 3 mm, and the length of stroke of the eccentric is also 3 mm. Consequently, when printing takes place, the pressure plate is located at a level which is 6 mm higher than the level occupied by the plate during a printing-block exchange sequence. If a printing-block exchange sequence is initiated when the knee-joint movement is activated, the printing-block exchange flap 62 would touch the slide 32 from one side, and the torque-limiting clutch 95 (FIG. 3) would slip. If, instead, this movement of the knee joint were to be initiated with the flap 62 located in the printing-block position, it would not be possible to straighten the knee joint, and damage to the printing-block exchanging mechanism is thus avoided. Thus, there is provided a mechanical safety factor additional to the aforesaid electrical safety factor.

The various functions are driven by a common motor (not shown) and the whole can be said to be bound with the rotation of the main shaft 40, which is operative in causing the film to be advanced through a distance of one frame and optionally printing to take place with each full revolution. Printing cannot take place during a printing-block exchange sequence, which requires six full revolutions of the main shaft 40, although the film is still advanced.

The illustrated automatic printing machine has been found to function rapidly and well, and test runs have shown that it can be operated at a speed of 16 frames per second with faultless printing results. Thus, in principle, a standard feature film (90 minutes at 24 frames per second) can be provided with sub-titles in two and a quarter hours, plus the time taken to change the reels. The saving in time is thus quite considerable.

Although the automatic printer according to the invention can, in principle, be operated under constant supervision, the machine can also be controlled suitably with the aid of a data processor. In this case, the processor is programmed with information relating to those film frames which are to be printed upon by the printing blocks arranged in given order in the transport path and the values of the pressure forces to be used with each text, in dependence on the number of letters in each text. There is also provided at some suitable location a film-frame sensing device adapted to send to the data processor a signal for each film frame which passes, in response to which the data processor sends respective control signals to the printing unit and the printing-block changing mechanism. Since the invention does not relate to such a data-processor system per se, and since one skilled in this art will readily understand how such a system should be constructed to fulfil the various control functions required, no description of such a system will be given here.

I claim:

1. An automatic printing machine for printing text on cinematographic film, said machine comprising (a) a film transport path (8) having a film-feed means incorporating a gripping mechanism (4) for feeding the film intermittently frame by frame;

(b) a printing-block position located in the film transport path;

(c) a pressure plate (31);

(d) means for synchronized movement of the pressure plate with the gripping mechanism towards and away from the printing-block position for printing said text;

(e) a counter-pressure plate (16) mounted on the side of the film transport path (8) remote from the printing-block position;

(f) a pressure-generating means for producing a variable pressure force between the pressure plate (31) and the counter-pressure plate (16);

(g) a first printing-block transport path (10) intended for the supply of printing blocks and extending parallel with the film transport path (8) along one edge side thereof;

(h) insertion means (61, 62) for moving a printing block along a glide path from the first printing-block transport path (10) to the printing block position;

(i) a second printing-bock transport path (12) which also extends parallel with the film transport path and which receives a printing block displaced from the printing block position, the counter-pressure plate (16) being journalled for linear movement in an open supporting bracket structure (30) attached to a stanchion;

(j) a first electric force-generator (25–28) independent of the supporting bracket structure and arranged to influence the counter-pressure plate (16) in its direction of linear movement towards the film transport path with a variable force, said first force-generator being independent of the supporting bracket structure (30) and including a rotary magnet (27) which is provided with a crank (28) acting on one end of a two-arm lever (25) the other end of which is placed against a stem (17) attached to the counter-pressure plate (16) and displaceable in the supporting bracket structure, whereby the counter-pressure exerted by the counter-pressure plate can be regulated by varying the strength of a current supplied to the rotary magnet.

2. An automatic printing machine according to claim 1, comprising a main shaft (40) connected to the gripping mechanism (71–74) so as to advance the film through a distance of one film frame for each revolution of said shaft, the shaft having eccentrically journalled thereon (39) one end of a first link (37) the other end of which in a knee joint (36) is journalled to one end of a second link (35), the other end of which is journalled (34) on a slide (33) one end of which constitutes said pressure plate (31), the slide (33) with the pressure plate (31) being actuatable for movement in response to rotation of the main shaft (40) via the eccentric journals, by means of a second electric force-generator (41) which, via a third link (45) attached to the knee joint (36), moves the knee joint (36) to an actuating position in which the directions of the first and the second links coincide.

3. An automatic printing machine according to claim 2, wherein the second electric force-generator (41) operative in manipulating the knee joint (36) has a limit switch (46) which inhibits the working movement of the printing-block exchange slide when the knee joint is moved to its actuating position.

* * * * *